May 4, 1965

L. GUIDO ETAL 3,181,913

DISPLAY HASSOCK

Filed March 27, 1964

INVENTORS
Earl S. Wedding
Lewis Guido

BY *Adolph B. Bugin*

ATTORNEY

May 4, 1965

L. GUIDO ETAL 3,181,913

DISPLAY HASSOCK

Filed March 27, 1964

INVENTORS
Earl S. Wedding
Lewis Guido

BY *Adolph B. Hugin*

ATTORNEY

May 4, 1965  L. GUIDO ETAL  3,181,913
DISPLAY HASSOCK
Filed March 27, 1964  3 Sheets-Sheet 3

INVENTORS
Earl S. Wedding
Lewis Guido

BY  *Adolph C. Hugin*
ATTORNEY

United States Patent Office 3,181,913
Patented May 4, 1965

3,181,913
DISPLAY HASSOCK
Lewis Guido, 6406 C St., Seat Pleasant, Md., and Earl S. Wedding, 4103 Crittenden St., Hyattsville, Md.
Filed Mar. 27, 1964, Ser. No. 355,206
7 Claims. (Cl. 297—462)

This invention relates to an improved novel hassock and more particularly to a utilitarian hassock constructed to provide a pleasing display.

According to one embodiment, a display enclosure is formed around a central supporting core, and between the top and bottom ends, in which a variety of floral, seasonal, or other attractive displays may be exhibited. A transparent casing of suitable material, such as 10 or 12 gauge clear plastic, is arranged around the outer peripheries of the top and bottom ends and provides the desired protection to the display and minimizes the entry of dust or dirt into the enclosure. Preferably, the display is illuminated, as by small electric lights, so as to enhance the appearance at night, and to provide a suitable night or TV light. The construction is very sturdy, and gives the hassock all properties desirable of such a piece of furniture, while additionally providing a very decorative object and a very useful new low-intensity light source. Provision is made for controlling the illumination, and the casing may be readily removably secured in position to allow for conveniently changing the decorative display, if desired.

An object of the present invention is the provision of a new type of decorative hassock.

Another object of this invention is the provision of an improved low-intensity light source, useful as a night light or TV light, which can also serve the utilitarian purposes of a hassock.

A further object of this invention is to provide a pleasingly illuminated decorative display in a novel hassock structure.

Further objects and advantages of this invention will become apparent from the following description referring to the accompanying drawings, and the features of novelty which characterize this invention will be pointed out with particularity in the claims appended to and forming a part of this specification.

For a better explanation of this invention, reference is made to the accompanying drawings, wherein.

Figure 6:
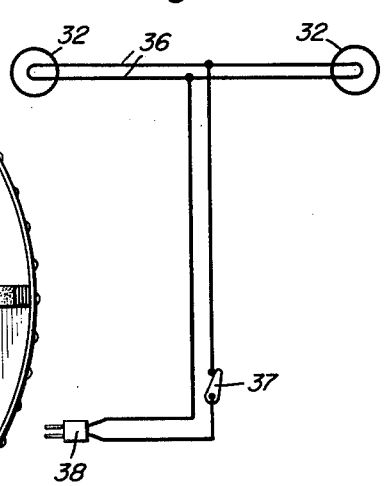
Figure 7:
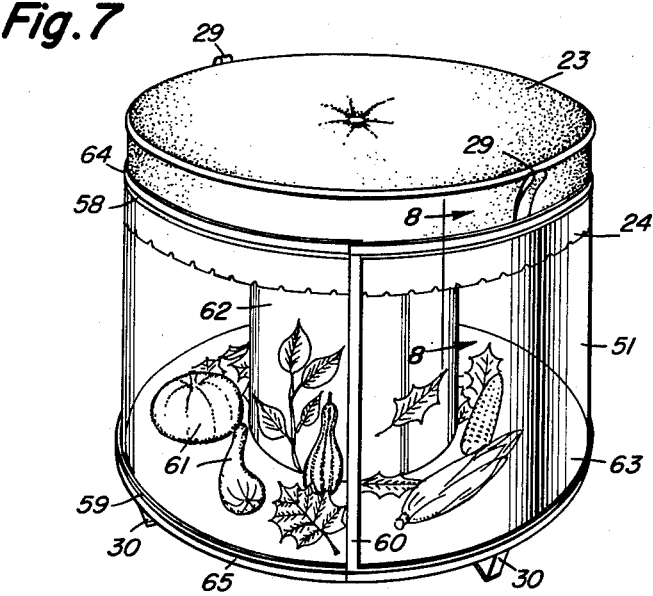
Figure 8:
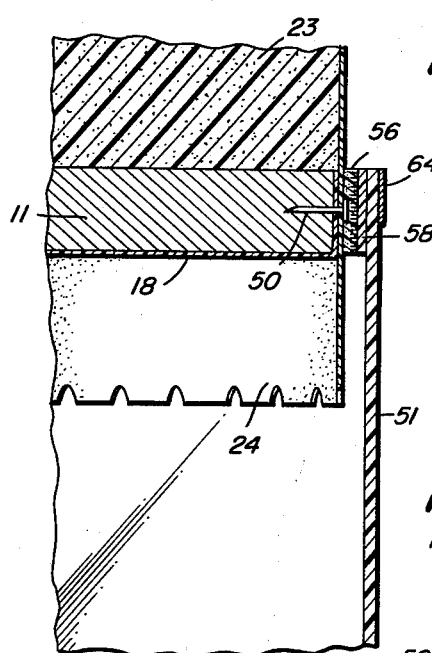
Figure 9:
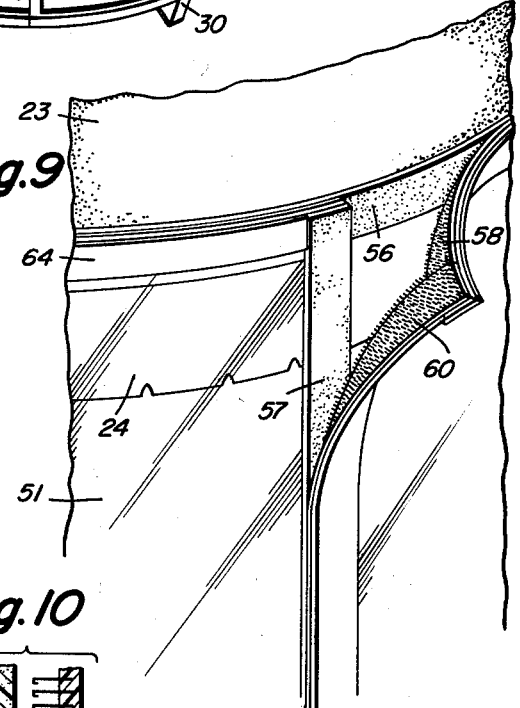
Figure 10:
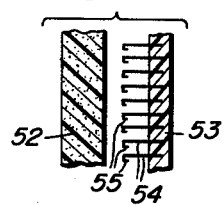

FIG. 6 schematically illustrates a suitable circuit for the lights in the hassock of FIGS. 1–4;

FIG. 7 is a perspective view of another embodiment of an improved hassock according to this invention, wherein the transparent enclosing casing is readily removably secured to the supporting structure of the hassock so as to facilitate access to the display in the enclosure;

FIG. 8 is an enlarged sectional view, taken along line 8—8 of FIG. 7, illustrating details of one manner of readily detachably securing the transparent casing to the supporting structure;

FIG. 9 is a fragmentary enlarged perspective view showing a manner in which the transparent casing of the hassock shown in FIGS. 7 and 8 may easily be detached and secured to the hassock supporting structure; and FIG. 10 is a further enlarged sectional view showing structural details through a suitable conventional readily detachable fastener of the type shown in FIGS. 7–9.

Referring to the drawings, an embodiment of the present invention is illustrated in FIGS. 1 through 6, which is especially sturdy and useful where it is desirable that the hassock should not be easily tampered with, as where small children are apt to use it or play with or around it. In this construction, the hassock comprises a main structural supporting member, generally of spool shape. This member has a central core which preferably is in the form of a hollow columnar cylinder 10 made of any suitable material, such as plywood of sufficient strength to support the weight of a person. A pair of substantially flat disk end plates 11 and 12 are arranged respectively on the top and bottom ends of the core. These are formed transversely larger than the diameter of the core cylinder 10 so as to provide overhanging flange portions 11′ and 12′ exteriorly of the core.

A sturdy, secure assembly of the end plates 11 and 12 on the core is assured by the provision of mounting grooves 13 and 14 in the inner faces of the plates 11 and 12, respectively, into which the adjacent ends of the core cylinder 10 are snugly fitted. The supporting member is further reinforced and secured together by a plurality of through bolts 15. These bolts preferably are fastened in place by nuts 16 in countersunk seats and are drawn up tightly in any suitable manner as by a screwdriver applied to the heads of the bolts.

In order to provide a more esthetically pleasing appearance, the core cylinder 10 preferably is covered by a sleeve 17 of any suitable decorative material which may conveniently be made to have a snug sliding fit over the cylinder. Both ends of the sleeve 17 preferably are secured to the ends of the cylinder 10 in any appropriate manner, as by being cemented thereto or stapled to that part of the cylinder which is fitted into the grooves 13 and 14 thereby concealing the staples. Likewise, the inner faces of the end plates 11 and 12 preferably are covered with the same or a harmonizing material. These coverings may be complete disks or simply rings 18 and 19. The outer edges of these coverings preferably are turned around the respective adjacent edges of the end plates and suitably fastened thereto by cement or staples, and the coverings are wedged tightly into the grooves 13 and 14 by the ends of the core cylinder 10, thus providing a well fitted covering with completely concealed fastenings. In addition, it may be desirable, especially for ease of assembly purposes, to secure the inner parts of the coverings to the end plates 11 and 12. This should be done at points inwardly of the grooves 13 and 14, so as to conceal the fastening devices, such as staples or tacks.

A decorative display enclosure is formed around the core and between the end plates in which any suitable decorations 20 may be mounted. These decorations may comprise any tastefully assembled flowers, leaves, gourds, fruits, futuristic or other exhibits and can be mounted or secured in any suitable manner, either permanently or detachably to the core cylinder and to the end plates by clips, staples, or other suitable fastening means. The decorations 20 may well be chosen as particularly appropriate to a special occasion or season of the year, or for the locale in which the hassock is normally to be used.

The decorative display is adapted to be protected against accidental or other damage and more effectively preserved against the injurious effects of dust, dirt, and other ambient variants and deleterious matters by a transparent casing or shield 21. This casing 21 can readily be made of a sheet of transparent plastic of suitable gauge, which is rolled around the outer edges of the end plates 11 and 12, with slightly overlapping longitudinal edges 22, and fastened to the edges of the end plates in any suitable manner, as by cementing thereto, tacks or staples.

In order to increase the utility of the hassock and provide a more comfortable resting area, the top of the upper end plate 11 preferably is covered by a suitable cushion 23, which may comprise a foam rubber or other suitable liner covered by an attractive covering. The esthetic appearance of the hassock may be further enhanced by a decorative skirt 24, which may be of the same material as the cushion covering or some other harmonizing material and color. As more clearly shown in FIGS. 1 and 2, the skirt 24 conveniently may be secured over the edges of the cushion covering and the upper edge of the casing 21, so as to give these a finished appearance and to conceal the fastening means along these edges. This skirt can be secured in any suitable manner to the edge of the upper end plate 11 as by antique hammer-head upholstery tacks 25. If desired, a decorative trim strip 26 also can be secured around the upper edge of the skirt 24, and preferably, a similar trim strip 27 is fastened over the lower edge of the casing 21. These can well be secured in position by the upholstery tacks 25 along the top of the casing and by similar tacks 28 along the lower edge thereof. Carrying handles 29 also may be provided, secured to the upper end plate 11; and suitable feet 30 may be secured to the underside of the bottom end plate 12.

The esthetic appeal and general utility of the hassock may be further enhanced by illuminating the decorations of the hassock and thus also providing a practical nightlight or TV light. In both instances, such lights preferably are of the subdued indirect type. This can readily be obtained by illuminating the hassock enclosure by a relatively small and preferably normally hidden or partially concealed electric light. As more clearly shown in FIGS. 2, 3, and 4, a small aperture 31, or a plurality of these, may be made through the core cylinder 10 and an electric light mounted in or adjacent to each such aperture. Each electric light may conveniently comprise a small electric light bulb 32 suitably mounted in and energized from a bulb socket 33. The socket may be mounted in position in any suitable manner, and preferably is detachably secured in position by a spring clip 34, fastened, as by a screw 35 to the adjacent end plate. Energization of the electric bulbs 32 may be provided by any suitable source of electric power supply, as by conventional battery which may be mounted within the hassock core cylinder or by a conventional house outlet plug. Such energization is supplied to the light sockets through appropriate leads 36 and controlled by a switch 37 suitably mounted on the hassock, as on the lower end plate 12, and accessible exteriorly of the hassock. In the case of a system adapted to use conventional house outlets, a conventional terminal plug 38 is electrically connected to the leads.

The finish of the hassock covering also preferably includes fastening of the edges 39 of the core covering material 17, in any suitable manner as by staples 40, drawn tightly over and around the edges of the apertures 31.

Figure 1:
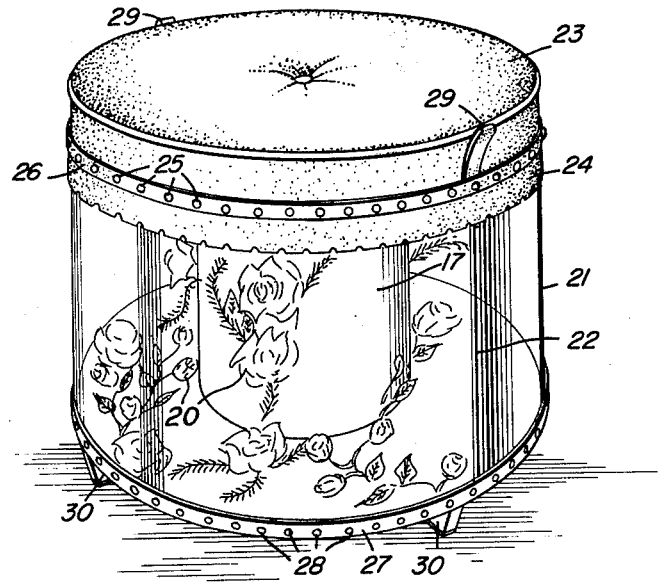
FIG. 1 is a perspective view of an improved hassock according to one embodiment of the present invention.
Figure 2:
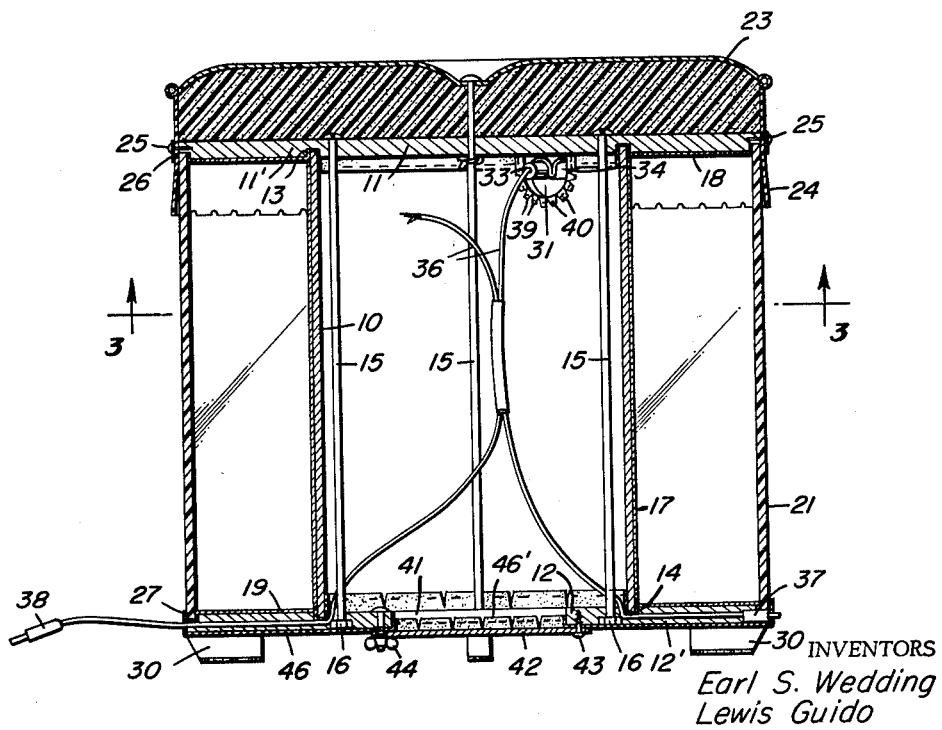
FIG. 2 is a vertical sectional view of the hassock shown in FIG. 1, taken along line 2—2 of FIG. 3.
Figure 3:
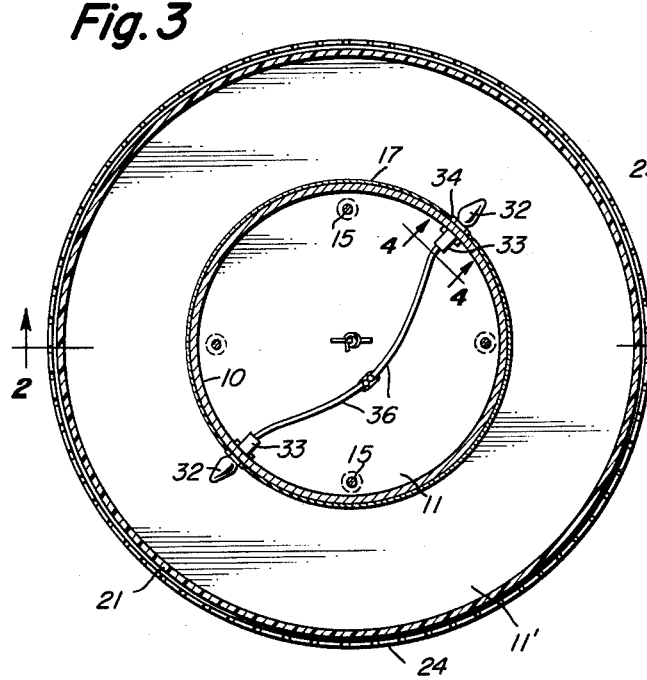
FIG. 3 is a sectional view of the hassock shown in FIGS. 1 and 2, taken along line 3—3 of FIG. 2 and showing details of the supporting structure and illuminating feature.
Figure 4:
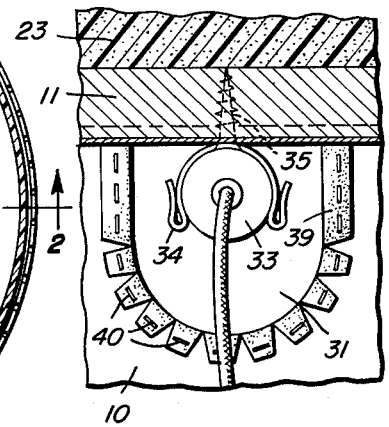
FIG. 4 is an enlarged detail view of one manner of suitably arranging and mounting an electric light for providing desirable illumination to a display in the hassock.
Figure 5:
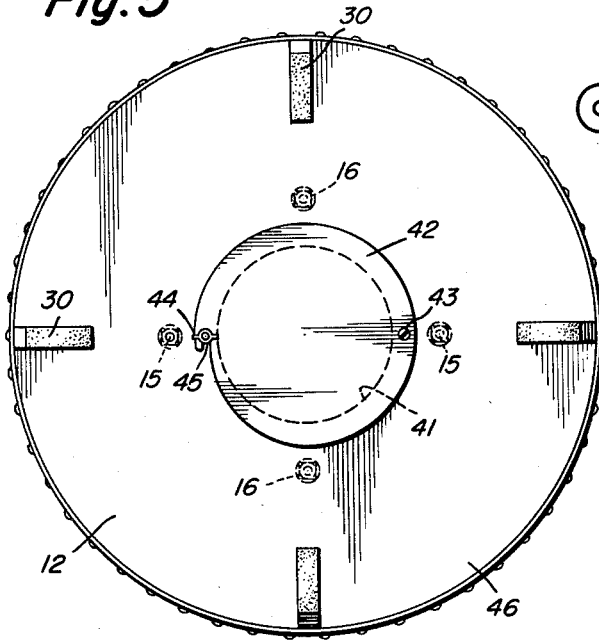
FIG. 5 is a plan view of the underside of the bottom of the hassock shown in FIGS. 1 and 2.

In order to adjust or replace an electric bulb 32, the lower end plate 12 is formed with a central access opening 41, and a suitable removable cover 42 is adapted to close this opening. As shown in FIG. 5, the cover 42 may be pivotally secured to the lower face of the bottom end plate 12 by a screw or bolt 43 and latched closed by a suitable bolt and wing nut 44 adapted releasably to engage a latching slot 45 in an edge of the cover 42. Preferably, the entire lower face of the bottom end plate 12 also is covered with a suitable material 46, which is fastened to the end plate 12 in any suitable manner, as by staples, cement or tacks, also preferably concealed by the trim strip 27 along the outer edge and the cover 42 along the inner edge. The edges 46' of the material 46 can conveniently be turned in and fastened as shown.

In order to increase the effectiveness of the decor of the hassock, another embodiment of the present invention includes an arrangement for an easy rearrangement, renewal, or complete replacement of the ornaments comprising the display. FIGS. 7–10 illustrate such an embodiment.

In such a construction the basic supporting structure may be of the same type as shown in FIGS. 1–6, and the upper end plate 11 may likewise be covered with a suitable cushion 23 similar to that of the first disclosed embodiment. The decorative coverings and the supporting legs or feet 30 also may be the same as in the first disclosed embodiment or equivalents thereof. The major variation in this embodiment is the manner in which the enclosure casing is secured to the remainder of the hassock.

In this hassock, the decorative skirt 24 is secured to the upper end plate 11 by any suitable means, such as staples, cement, or tacks 50, and may be an extension of the covering of the cushion 23, as may be seen in FIG. 8. It is not arranged over the enclosure casing as in the first disclosed embodiment, but is adapted to be covered by such a casing.

In order to provide the desired easy access to the display enclosure, the casing 51 of suitable transparent material, such as plastic, is provided with a fastener for readily detachably securing the casing 51 to the hassock. Such a fastener may comprise any of various conventional available fasteners, generally called "zippers." One such zipper includes a fibrous plastic fabric strip 52 secured to one member and a brush like plastic fastener strip 53 secured to the member to be attached to the first member. The brush-like strip is formed with a multiplicity of short plastic bristles 54 over one face thereof, and the ends 55, FIG. 10, of these bristles are formed as very small hooks. In order detachably to secure one member to the other, the brush-like strip is simply pressed against the fabric strip and the hooked ends 55 of the bristles 54 securely, detachably are embedded in latching engagement in the fibrous fabric. The two strips may be readily separated by simply pulling them apart. This type zipper does not form a part of this invention and is available on the open market.

As more clearly shown in FIGS. 7, 8, and 9, the outer peripheral edge of both of the end plates 11 and 12 has secured thereto one strip of a suitable zipper fastener, in this case a fibrous plastic fabric strip 56. This strip may be sewn to the material of the skirt 24, stapled, tacked, or cemented to the surface of the skirt over the outer edge of the top end plate 11 and another similar strip likewise suitably secured to the outer edge of the bottom end plate 12. A similar plastic fibrous fabric strip 57 is suitably secured, as stated, to the outside of one of the transverse edges of the casing 51. Complementary brush-like strips 58, 59, and 60 plastic zipper fastener are secured to the inside of the transparent plastic casing 51 by any suitable means, such as stitching or cementing thereto, with the hooked-end bristles facing in a direction to provide for secure detachable engagement with the strips 56 and strip 57. This provides for securely fastening the casing 51 around the hassock to complete the display enclosure, as in the first embodiment, and additionally provides for its ready removal to facilitate a rearrangement or replacement of the decorative display elements 61 secured in any suitable manner to the core 62 and the end plate 63. In most instances, it will be found desirable also to provide the same illumination features to this type hassock as disclosed with reference to the first embodiment.

The under face of the upper end plate 11 preferably is covered with suitable material 18, as in the first embodiment; and trim strips 64 and 65 also preferably are suitably secured, as by sewing or cementing to the plastic casing 51 along the upper and lower outer edges over part or all of the part to which the plastic zipper 58 is secured.

The remainder of the hassock may be finished generally the same as the first illustrated embodiment.

While particular embodiments of this invention have been illustrated and described, modifications thereof will occur to those skilled in the art. It is to be understood, therefore, that all arrangements and constructions within the spirit and scope of this invention are intended to be covered by the appended claims forming a part of this application.

What is claimed is:

1. A hassock comprising a supporting member having a central core with an end plate on each end of said core, said end plates being larger transversely than said core with portions overhanging exteriorly of said core, means securing said core and end plates in assembled relation, a cushion mounted on one of said end plates, a transparent side wall casing separate from said cushion and extending around said end plates and spaced outwardly from said core providing an enclosure therebetween, means for removably securing said casing to said end plates, and decorative members mounted within the enclosure of said casing around said core.

2. A hassock comprising a supporting member having a central hollow core with an end plate on each end of said core, said end plates being larger transversely than said core with portions overhanging exteriorly of said core, means securing said core and end plates in assembled relation, a transparent plastic casing extending around said end plates and enclosing said core providing an enclosure therebetween, means for readily removably securing said casing to said supporting member end plates and for securing together the edges of said casing providing a closed casing, decorative members mounted within the enclosure of said casing around said core, and a cushion mounted on one of said end plates.

3. A hassock comprising a supporting member having a central hollow cylindrical columnar core with a substantially flat disk end plate on each end of said cylindrical core, said disk end plates being larger transversely than said core with overhanging flange portions exteriorly of said core, means securing said core and disk end plates in assembled relation, a transparent plastic casing extending around said end plates and enclosing said core, means including a plastic zipper having one part thereof secured to the periphery of one of said disk end plates for removably securing said casing to said hassock supporting member, decorative members replaceably mounted within the enclosure of said casing around said core, feet on one of said end plates and a cushion on the outside of the other of said end plates.

4. A hassock comprising a supporting member having a central core with an end plate on each end of said core, said end plates being larger transversely than said core with portions overhanging exteriorly of said core, means securing said core and end plates in assembled relation, a transparent plastic casing extending around said end plates and enclosing said core providing an enclosure therebetween, means for securing said casing to said hassock, decorative members mounted within the enclosure of said casing around said core, an aperture through the side of said core, a source of illumination mounted adjacent to said aperture to provide illumination to said enclosure, an access opening through one of said end plates, a removable cover over said end plate opening to provide for replacement and adjustment of said source of illumination, and a cushion secured to the outside of the end plate on the end of said core opposite said access opening.

5. A hassock comprising a supporting member having a central hollow core with an end plate on each end of said core, said end plates being larger transversely than said core with portions overhanging exteriorly of said core, means securing said core and end plates in assembled relation, a transparent plastic casing extending around said end plates and enclosing said core providing an enclosure therebetween, means for removably securing said casing to said end plates, decorative members mounted within the enclosure of said casing around said core, an aperture through the side of said core, an electric light replaceably mounted adjacent to said aperture to provide illumination to said enclosure, means for connecting said electric light to a source of power, an access opening through one of said end plates to provide for replacement and adjustment of said electric light, and a cushion mounted on the end plate on the end of said core opposite said access opening.

6. A hassock comprising a supporting member having a central hollow core with an end plate on each end of said core, said end plates being larger transversely than said core with portions overhanging exteriorly of said core, means securing said core and end plates in assembled relation, a casing formed of a sheet of transparent plastic extending around said end plates with slightly overlapping longitudinal edges and enclosing said core providing an enclosure therebetween, means for removably securing said casing to said end plates and removably securing together said overlapping edges of said casing, decorative members mounted within the enclosure of said casing around said core, an aperture through the side of said core, an electric light replaceably mounted adjacent to said aperture to provide illumination to said enclosure, means for connecting said electric light to a source of power, an access opening through one of said end plates to provide for replacement and adjustment of said electric light, means on the exterior of said hassock for controlling said electric light, and a cushion mounted on the end plate on the end of said core opposite said access opening.

7. A hassock comprising a supporting member having a central hollow columnar core with a pair of substantially flat disk end plates arranged one on each opposite end of said core, said disk end plates being larger transversely than said core with overhanging flange portions exteriorly of said core and each having a groove therein into which the adjacent end of said core is snugly fitted, a plurality of through tie-bolt members securing said core and disk end plates in assembled relation, a casing formed of a sheet of transparent plastic extending around the outer edges of said end plates and enclosing said core and having slightly overlapping longitudinal edges, means including a plastic zipper for removably securing each end of said casing to said hassock and for removably securing together said overlapping edges of said casing, decorative members mounted within the enclosure of said casing around said core, a plurality of apertures through said core adjacent to one of said end plates, sources of illumination mounted adjacent to said apertures to provide illumination to said enclosure, means on the exterior of said hassock for controlling said sources of illumination, an access opening through one of said end plates, a removable cover over said end plate opening to provide for replacement and adjustment of said sources of illumination, and a cushion on the end plate on the end of said core opposite said access opening.

References Cited by the Examiner

UNITED STATES PATENTS

| 1,713,386 | 5/29 | Kelley | 40—132 |
| 2,600,664 | 6/52 | Leech | 40—132 |
| 2,638,533 | 5/53 | Zobian | 40—132 X |
| 3,002,789 | 10/61 | Brown | 297—462 |
| 3,023,050 | 2/62 | Jensen | 297—462 |
| 3,063,749 | 11/62 | Struble et al. | 297—391 |
| 3,110,532 | 11/63 | Nail | 297—462 |

FRANK B. SHERRY, *Primary Examiner.*